United States Patent
Ando

(10) Patent No.: US 9,497,018 B2
(45) Date of Patent: Nov. 15, 2016

(54) RELAY DEVICE, COMMUNICATION SYSTEM AND RELAY METHOD

(71) Applicant: Yasuomi Ando, Tokyo (JP)

(72) Inventor: Yasuomi Ando, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/424,336

(22) PCT Filed: Nov. 28, 2012

(86) PCT No.: PCT/JP2012/080716
§ 371 (c)(1),
(2) Date: Feb. 26, 2015

(87) PCT Pub. No.: WO2014/083628
PCT Pub. Date: Jun. 5, 2014

(65) Prior Publication Data
US 2015/0256327 A1    Sep. 10, 2015

(51) Int. Cl.
*H04L 7/00*    (2006.01)
*H04L 25/20*   (2006.01)

(52) U.S. Cl.
CPC ............... *H04L 7/0041* (2013.01); *H04L 7/00* (2013.01); *H04L 25/20* (2013.01)

(58) Field of Classification Search
CPC ........ H04L 25/20; H04L 7/00; H04L 7/0041
USPC .......................................................... 370/517
See application file for complete search history.

(56) References Cited

U.S. PATENT DOCUMENTS

| | | |
|---|---|---|
| 5,146,477 A | 9/1992 | Cantoni et al. |
| 5,414,739 A | 5/1995 | Kobayashi et al. |
| 6,658,073 B1 | 12/2003 | Grunert |
| 6,751,228 B1 | 6/2004 | Okamura |
| 6,934,287 B2 | 8/2005 | Okamura |
| 6,940,855 B2 | 9/2005 | Okamura |

(Continued)

FOREIGN PATENT DOCUMENTS

| | | |
|---|---|---|
| CN | 102138302 | 7/2011 |
| JP | 61 182343 | 8/1986 |

(Continued)

OTHER PUBLICATIONS

Japanese Office Action issued May 12, 2015 in Patent Application No. 2014-549680 (with English Translation).

(Continued)

*Primary Examiner* — Chi H Pham
*Assistant Examiner* — Robert Lopata
(74) *Attorney, Agent, or Firm* — Oblon, McClelland, Maier & Neustadt, L.L.P.

(57) ABSTRACT

A jitter occurring due to a difference in operation timing between a receiving part and a processing part is reduced. The receiving part receives reception data. The processing part processes the reception data and generates transmission data. A transmitting part transmits the transmission data at a timing at which a transmission delay time has passed since a timing at which the processing part generates the transmission data. The transmission delay time is a time obtained by subtracting a process delay time from an overall delay time. The process delay time is a time that passes since a timing at which the receiving part receives the reception data until a timing at which the processing part processes the reception data.

7 Claims, 5 Drawing Sheets

(56) References Cited

U.S. PATENT DOCUMENTS

| | | | |
|---|---|---|---|
| 6,985,501 B2 | 1/2006 | Suzuki et al. | |
| 8,355,329 B2 | 1/2013 | Ishikawa | |
| 8,599,883 B2 | 12/2013 | Karino | |
| 2004/0128413 A1* | 7/2004 | Chelcea | G06F 5/14 710/52 |
| 2009/0061920 A1* | 3/2009 | Horiuchi | H04L 5/0044 455/522 |
| 2010/0265996 A1* | 10/2010 | Lim | H04B 7/15528 375/211 |
| 2011/0261745 A1* | 10/2011 | Bontu | H04B 7/15592 370/315 |
| 2012/0045986 A1* | 2/2012 | Jitsukawa | H04B 7/15507 455/7 |
| 2012/0046043 A1* | 2/2012 | Jitsukawa | H04B 7/155 455/456.1 |
| 2012/0208523 A1* | 8/2012 | Hans | H04W 64/00 455/422.1 |
| 2012/0307712 A1* | 12/2012 | Watanabe | H04B 7/2606 370/315 |
| 2013/0077509 A1* | 3/2013 | Hirota | H04L 47/56 370/252 |
| 2013/0336341 A1* | 12/2013 | Kamada | H04J 3/0667 370/503 |
| 2015/0222520 A1* | 8/2015 | Thrybom | H04L 43/0852 370/252 |

FOREIGN PATENT DOCUMENTS

| | | |
|---|---|---|
| JP | 63 303533 | 12/1988 |
| JP | 1 502711 | 9/1989 |
| JP | 2 81527 | 3/1990 |
| JP | 4 278746 | 10/1992 |
| JP | 5 37560 | 2/1993 |
| JP | 5 136775 | 6/1993 |
| JP | 10 341233 | 12/1998 |
| JP | 2000 278275 | 10/2000 |
| JP | 2000 332802 | 11/2000 |
| JP | 2001 352316 | 12/2001 |
| JP | 2003 516092 | 5/2003 |
| JP | 2010 56947 | 3/2010 |
| JP | 2010 93410 | 4/2010 |
| JP | 2011 77751 | 4/2011 |

OTHER PUBLICATIONS

Dinh Thai Bui et al., "Packet Delay Variation Management for a Better IEEE 1588V2 Performance", ISPCS 2009 International IEEE Symposium on Precision Clock Synchronization for Measurement. Control and CommuniC3lion, Oct. 12-16, 2009, 6 pages.

Foreign Office Action Issued Oct. 27, 2014 in Taiwan Patent Application No. 102103422 Filed Jan. 30, 2013 (with partial English translation) (Total 6 pages).

3GPP TS 05.10 V8.12.0 , "3rd Generation Partnership Project; Technical Specification Group GSM/EDGE Radio Access Network; Digital cellular telecommunications system (Phase 2+); Radio sub-system synchronization", (Aug. 2003), (Total 2 pages).

International Search Report Issued Jan. 29, 2013 in PCT/JP2012/080716 Filed Nov. 28, 2012.

Office Action mailed Aug. 1, 2016 in Korean Application No. 10-2015-7014263 (w/English translation).

* cited by examiner

RELAY DEVICE, COMMUNICATION SYSTEM AND RELAY METHOD

TECHNICAL FIELD

The present invention relates to a relay device that relays data.

BACKGROUND ART

When a relay device relays data, a delay may accompany the relaying.

If the delay accompanying the relaying is almost constant, although the data arrives at a receiving device with a delay, the intervals of a plurality of consecutive data to arrive at the receiving device are almost the same as the intervals at which a transmitting device has sent the data.

Hence, it is desired that the fluctuation (jitter) of the delay time accompanying the relay be small.

CITATION LIST

Patent Literature

Patent Literature 1: JP 2011-77751
Patent Literature 2: JP 5-37560
Patent Literature 3: JP 2000-278275
Patent Literature 4: JP 1-502711
Patent Literature 5: JP 61-182343
Patent Literature 6: JP 5-136775
Patent Literature 7: JP 63-303533
Patent Literature 8: JP 2000-332802
Patent Literature 9: JP 2001-352316
Patent Literature 10: JP 2003-516092
Patent Literature 11: JP 2010-93410
Patent Literature 12: JP 2-81527
Patent Literature 13: JP 4-278746

SUMMARY OF INVENTION

Technical Problem

Jitters occur due to various causes.

For example, if the operation timings differ as in a case where, for example, the operation clock of a receiving part which receives data being relayed and the operation clock of a processing part which processes the data being relayed differ, a jitter may occur due to the difference between the operation timings.

It is, for example, an object of the present invention to reduce the jitter occurring due to the difference in operation timing between the receiving part and the processing part.

Solution to Problem

A relay device according to the present invention includes:
 a receiving part that receives reception data;
 a processing part that processes the reception data and generates transmission data; and
 a transmitting part that transmits the transmission data at a timing at which a transmission delay time has passed since a timing at which the processing part generates the transmission data,
 the transmission delay time being a time obtained by subtracting a process delay time from a predetermined overall delay time,
 the process delay time being a time that passes since a timing at which the receiving part receives the reception data until a timing at which the processing part processes the reception data.

Advantageous Effects of Invention

With the relay device according to the present invention, the jitter caused by the difference in operation timing between the receiving part and the processing part can be reduced.

DESCRIPTION OF EMBODIMENTS

Embodiment 1

Embodiment 1 will be described with reference to FIG. 1 to FIG. 3.

Figure 1:
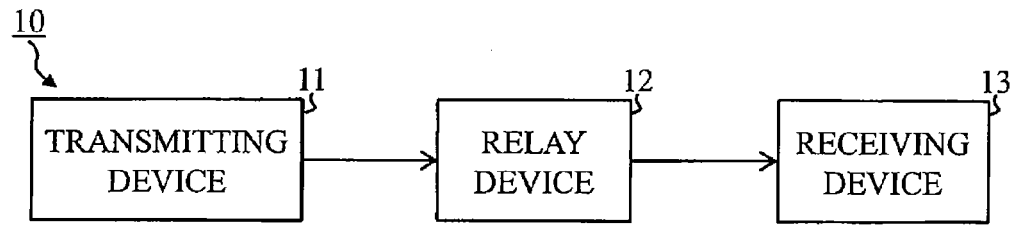
FIG. 1 illustrates an example of the overall configuration of a communication system 10 according to Embodiment 1.

FIG. 1 illustrates an example of the overall configuration of a communication system 10 according to this embodiment.

The communication system 10 has, for example, a transmitting device 11, a relay device 12, and a receiving device 13.

The transmitting device 11 and relay device 12 are connected to be able to communicate with each other via, for example, a cable, a radio channel, or a network. Likewise, the relay device 12 and receiving device 13 are connected to be able to communicate with each other via, for example, a cable, a radio channel, or a network.

There may be a plurality of relay devices 12. In that case, the first relay device 12 is connected to be able to communicate with the transmitting device 11 and the next relay device 12. The intermediate relay device 12 is connected to be able to communicate with its precedent relay device 12 and its next relay device 12. The last relay device 12 is connected to be able to communicate with its precedent relay device 12 and the receiving device 13.

The transmitting device 11 transmits data. The relay device 12 relays the data transmitted by the transmitting device 11. The receiving device 13 receives the data relayed by the relay device 12.

The data transmitted by the transmitting device 11 is data, such as streaming data, whose timing at which it is received by the receiving device 13 is significant. Particularly, when the transmitting device 11 transmits a plurality of pieces of data at certain intervals, it is desired that the receiving device 13 receive the pieces of data at almost the same intervals as the transmission intervals.

For this purpose, it is important to reduce the fluctuation (jitter) of the delay time occurring due to the data relay.

Figure 2:
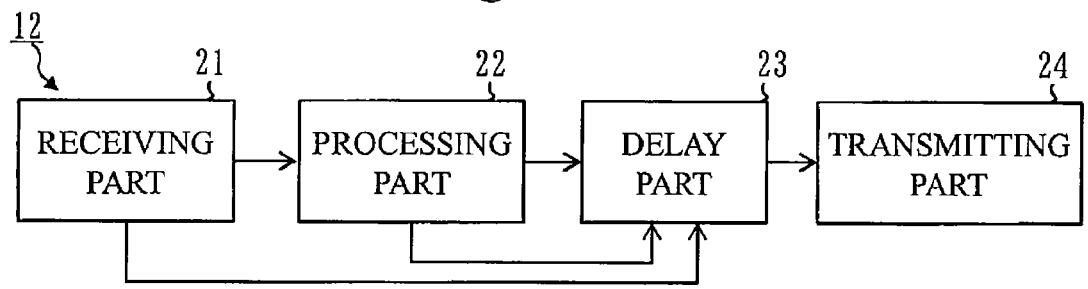
FIG. 2 illustrates an example of the function block configuration of a relay device 12 according to Embodiment 1.

FIG. 2 illustrates an example of the function block configuration of the relay device 12 according to this embodiment.

The relay device 12 has, for example, a receiving part 21, a processing part 22, a delay part 23, and a transmitting part 24.

The receiving part 21 receives the data transmitted by the transmitting device 11 (or the precedent relay device 12). The data received by the receiving part 21 will be called "reception data" hereinafter.

The processing part 22 processes the reception data and generates data to be transmitted by the transmitting part 24. The data to be transmitted by the transmitting part 24 will be called "transmission data" hereinafter.

The delay part 23 takes the transmission data generated by the processing part 22 and outputs the taken transmission data to the transmitting part 24. The delay part 23 waits for the lapse of a certain time period since having taken the transmission data, and then outputs the transmission data.

The transmitting part 24 transmits the transmission data outputted by the delay part 23, to the receiving device 13 (or the next relay device 12). Because of the delay by the delay part 23, the transmitting part 24 transmits the transmission data at a timing at which the certain time period has passed since a timing at which the processing part generates the transmission data. The delay time that passes since the processing part 22 generates the transmission data until the transmitting part 24 transmits the transmission data will be called "transmission delay time".

The receiving part 21 and the processing part 22 do not necessarily synchronize with each other. Thus, a non-constant delay occurs between the timing at which the receiving part 21 receives the reception data and the timing at which the processing part 22 processes the reception data. This delay time will be called "process delay time".

The delay part 23 delays the transmission data such that the sum of the process delay time and transmission delay time is a constant time (to be referred to as "total delay time" hereinafter). For example, the delay part 23 calculates the process delay time based on the timing at which the receiving part 21 received the reception data and the timing at which the processing part 22 started processing the reception data. The delay part 23 calculates, as the transmission delay time, a difference obtained by subtracting the calculated process delay time from a predetermined overall delay time. The delay part 23 takes the transmission data generated by the processing part 22, and outputs the transmission data when the calculated transmission delay time passes.

This can eliminate the influence that the process delay time exerts on the time it takes since the receiving part 21 receives the reception data until the transmitting part 24 transmits the transmission data.

Figure 3:
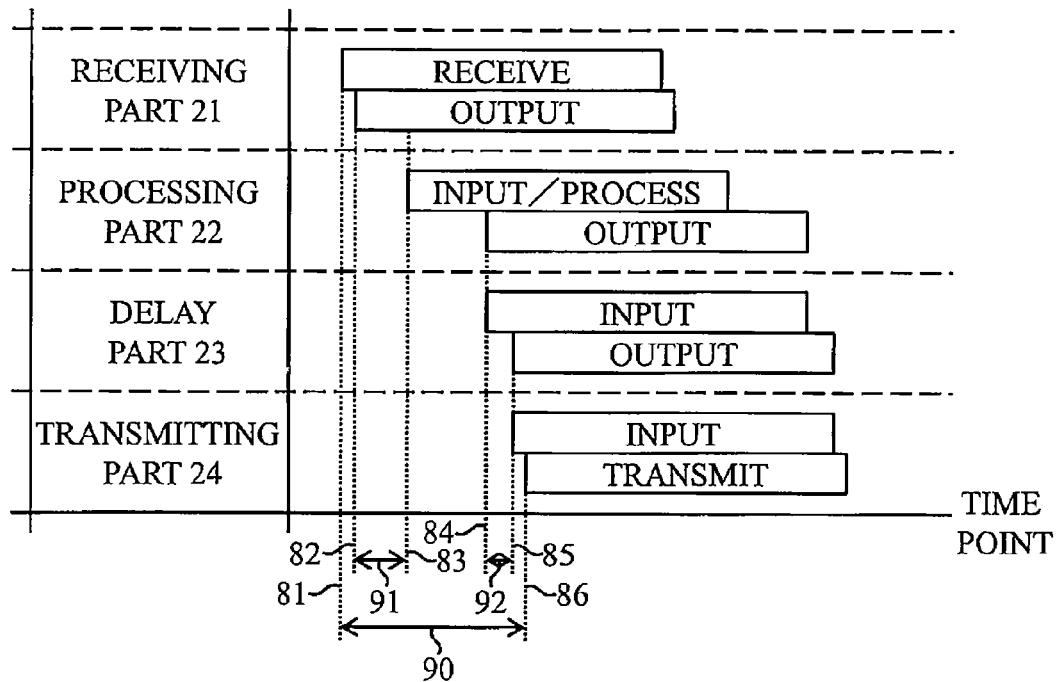
FIG. 3 illustrates an example of the operation timings of the relay device 12 according to Embodiment 1.

FIG. 3 illustrates an example of the operation timings of the relay device 12 according to this embodiment.

The axis of abscissa represents the time point.

As the receiving part 21 receives the reception data, it outputs the received reception data in parallel. For example, the receiving part 21 starts receiving the reception data at a time point 81 and starts outputting the reception data at a time point 82. Assume that the time it takes since the receiving part 21 starts receiving the reception data until the receiving part 21 starts outputting the reception data is almost constant.

As the processing part 22 takes the reception data outputted by the receiving part 21, it processes the taken reception data in parallel and outputs the transmission data. For example, the processing part 22 starts taking the reception data at a time point 83 at which a process delay time 91 has passed since the time point 82, and starts outputting the transmission data at a time point 84. Assume that the time it takes since the processing part 22 starts taking the reception data until the processing part 22 starts outputting the transmission data is almost constant.

As the delay part 23 takes the transmission data outputted by the processing part 22, it outputs the taken transmission data in parallel with a delay. For example, the delay part 23 starts taking the transmission data at the time point 84, and starts outputting the transmission data at a time point 85 at which a transmission delay time 92 has passed since the time point 84. The transmission delay time 92 changes depending on the process delay time 91.

As the transmitting part 24 takes the transmission data outputted by the delay part 23, it transmits the taken transmission data in parallel. For example, the transmitting part 24 starts taking the transmission data at the time point 85, and starts transmitting the transmission data at a time point 86. Assume that the time it takes since the transmitting part 24 starts taking the transmission data until the transmitting part 24 starts transmitting the transmission data is almost constant.

From the foregoing, what changes is the process delay time 91 and transmission delay time 92 of a delay time 90 it takes since the relay device 12 starts receiving the reception data until the relay device 12 starts transmitting the transmission data. As the sum of the process delay time 91 and the transmission delay time 92 is constant, the delay time 90 will be almost constant.

As a result, the jitter occurring due to the data relay can be reduced.

Embodiment 2

Embodiment 2 will be described with reference to FIG. 4 to FIG. 5.

Portions that are common with Embodiment 1 will be denoted by the same reference numerals as in Embodiment 1, and their explanation will be omitted.

This embodiment will describe a specific example of the relay device 12 described in Embodiment 1.

Figure 4:
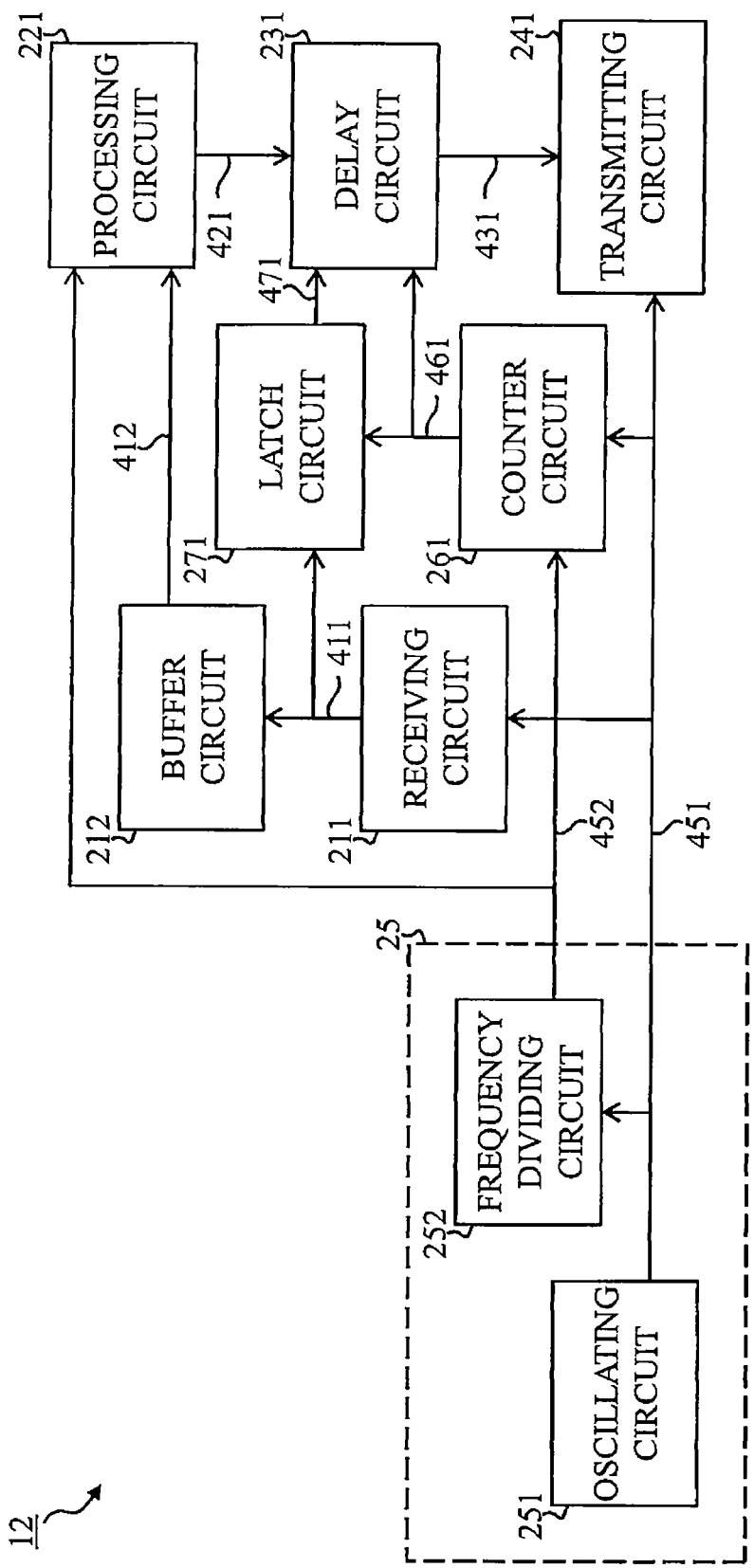
FIG. 4 illustrates an example of the circuit configuration of a relay device 12 according to Embodiment 2.

FIG. 4 illustrates an example of the circuit configuration of a relay device 12 according to this embodiment.

The relay device 12 has, for example, a receiving circuit 211, a buffer circuit 212, a processing circuit 221, a delay circuit 231, a transmitting circuit 241, a clock generating part 25, a counter circuit 261, and a latch circuit 271.

The clock generating part 25 generates two clock signals 451 and 452.

The clock signal 451 is a signal that serves as a reference when determining the operation timings of the receiving circuit 211 and transmitting circuit 241. The clock signal 451 is an example of the first clock and third clock.

The clock signal 452 is a signal that serves as a reference when determining the operation timing of the processing circuit 221. The clock signal 452 is an example of the second clock.

The frequency (processing frequency) of the clock signal 452 is lower than the frequency (communication frequency) of the clock signal 451.

The clock generating part 25 has, for example, an oscillating circuit 251 and a frequency dividing circuit 252.

The oscillating circuit 251 has, for example, a quartz oscillator, and generates the clock signal 451.

The frequency dividing circuit 252 generates the clock signal 452 by frequency-dividing the clock signal 451. The frequency-dividing ratio of the frequency dividing circuit 252 is, for example, 4. In this case, the frequency of the clock signal 452 is ¼ the frequency of the clock signal 451.

The receiving circuit 211 receives data transmitted by a transmitting device 11 (or a precedent relay device 12) and outputs reception data 411. The receiving circuit 211 is an example of a receiving part 21. The receiving circuit 211 operates at a timing that is synchronized with the clock signal 451.

The buffer circuit 212 temporarily stores the reception data outputted by the receiving circuit 211. The buffer circuit 212 is a FIFO-type buffer that can read stored reception data in order of old to new.

The processing circuit 221 reads and processes reception data 412 stored by the buffer circuit 212, and generates and outputs transmission data 421. The processing circuit 221 is an example of a processing part 22. The processing circuit 221 operates at a timing that is synchronized with the clock signal 452.

The counter circuit 261 counts the cycles of the clock signal 451 on the basis of the cycle of the clock signal 452. The value counted by the counter circuit 261 will be called "count value". The counter circuit 261 outputs a count value 461 counted.

For example, when the frequency of the clock signal 451 is four times the frequency of the clock signal 452, one cycle of the clock signal 452 corresponds to four cycles of the clock signal 451. The counter circuit 261 counts to know on which one of the four cycles the current clock signal 451 falls.

For example, the counter circuit 261 increments the count value 461 in synchronism with the rising edge of the clock signal 451. Also, the counter circuit 261 resets the count value 461 to 0 in synchronism with the rising edge of the clock signal 452. Hence, when the cycle of the clock signal 451 is the first cycle, the count value 461 becomes 0. When the cycle of the clock signal 451 is the second cycle, the count value 461 becomes 1. When the cycle of the clock signal 451 is the third cycle, the count value 461 becomes 2. When the cycle of the clock signal 451 is of the fourth cycle, the count value 461 becomes 3.

The latch circuit 271 stores the count value 461 of the counter circuit 261 at a timing at which the receiving circuit 211 starts outputting the reception data. The latch circuit 271 outputs a stored count value 471. The latch circuit 271 holds the stored count value until the receiving circuit 211 starts outputting the next reception data. The latch circuit 271 is an example of a recording part. The count value 471 is an example of delay time information and an example of a transmission delay number.

The delay circuit 231 takes the transmission data 421 outputted by the processing circuit 221, and outputs the transmission data 421 with a delay. The delay circuit 231 is an example of a delay part 23. The delay circuit 231 outputs transmission data 431 at a timing at which the count value 461 of the counter circuit 261 and the count value 471 of the latch circuit 271 coincide.

The transmitting circuit 241 takes the transmission data 431 outputted by the delay circuit 231, and transmits the transmission data 431. The transmitting circuit 241 is an example of a transmitting part 24. The transmitting circuit 241 operates at a timing that is synchronized with the clock signal 451.

Figure 5:
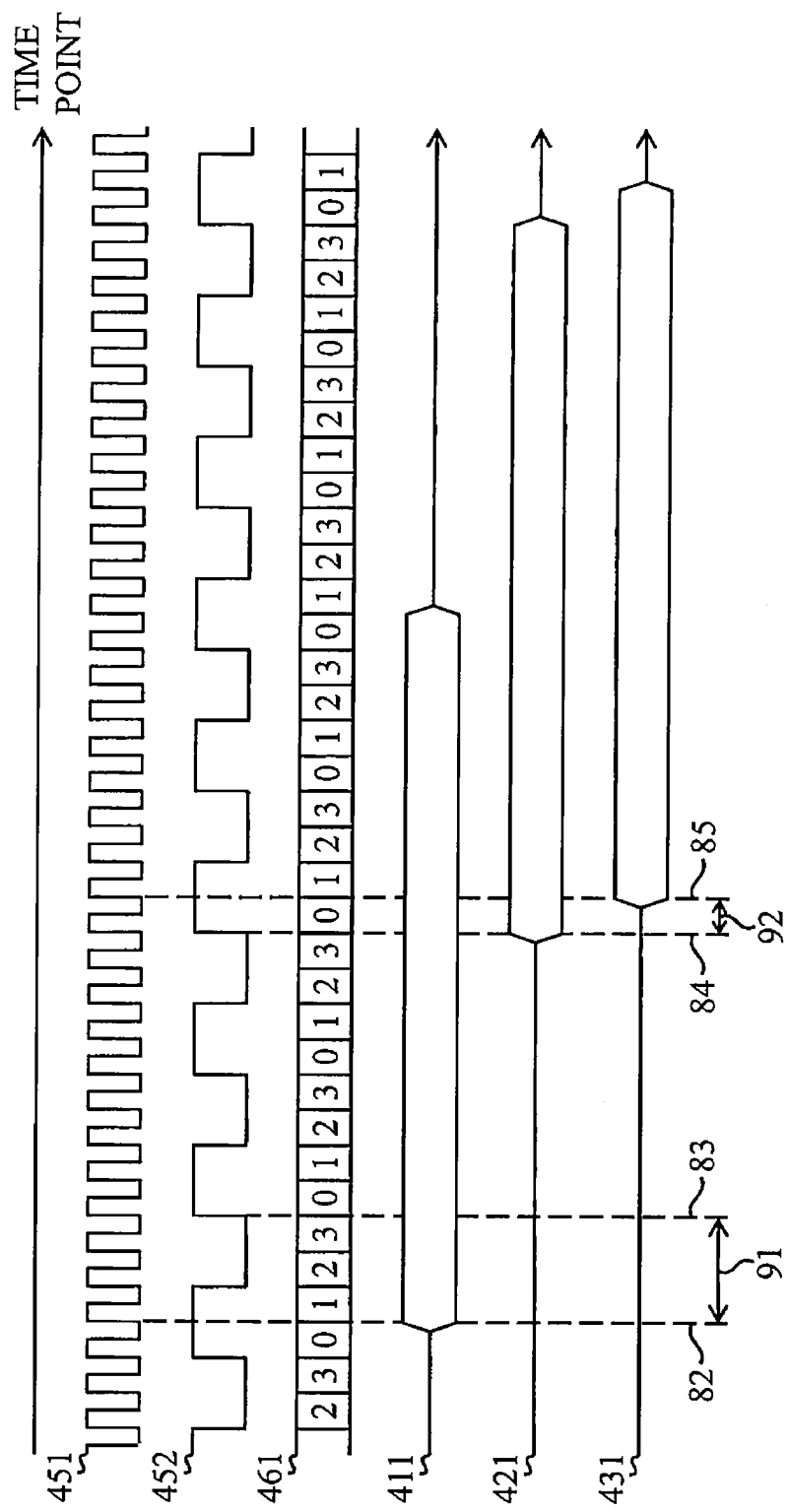
FIG. 5 illustrates an example of the operation timings of the relay device 12 according to Embodiment 2.

FIG. 5 illustrates an example of the operation timings of the relay device 12 according to this embodiment.

The axis of abscissa represents the time point.

In this example, the frequency of the clock signal 451 is four times the frequency of the clock signal 452. Four cycles of the clock signal 451 correspond to one cycle of the clock signal 452.

From the rising edges of the clock signal 451 and clock signal 452 through the next rising edge of the clock signal 451, the count value 461 of the counter circuit 261 stays 0. Each time the clock signal 451 rises, the count value 461 of the counter circuit 261 increments. Note that after counting 3, the count value 461 returns to 0.

The receiving circuit 211 outputs the reception data 411 in synchronism with the rising edge of the clock signal 451. For example, the receiving circuit 211 starts outputting the reception data 411 at a time point 82. At this time, since the count value 461 of the counter circuit 261 is 1, the latch circuit 271 stores 1 as the count value 471.

The processing circuit 221 takes the reception data 412 in synchronism with the rising edge of the clock signal 452, and processes the reception data 412. More specifically, the processing circuit 221 takes the reception data 412 at a timing at which the count value 461 of the counter circuit 261 is 0, and processes the reception data 412. For example, the processing circuit 221 starts taking the reception data 412 at the time point 83.

At this time, the process delay time 91 is equal to three cycles of the clock signal 451.

Assuming that the receiving circuit 211 starts outputting the reception data when the count value 461 of the counter circuit 261 is 0, the process delay time 91 is equal to four cycles of the clock signal 451.

Assuming that the receiving circuit 211 starts outputting the reception data when the count value 461 of the counter circuit 261 is 2, the process delay time 91 is equal to two cycles of the clock signal 451.

Assuming that the receiving circuit 211 starts outputting the reception data when the count value 461 of the counter circuit 261 is 3, the process delay time 91 is equal to one cycle of the clock signal 451.

Hence, by referring to the count value 471 stored by the latch circuit 271, it is possible to grasp the process delay time 91 corresponds to how many cycles of the clock signal 451.

The processing circuit 221 outputs the transmission data 421 in synchronism with the rising edge of the clock signal 452. More specifically, the processing circuit 221 outputs the transmission data at a timing at which the count value 461 of the counter circuit 261 is 0. For example, the processing circuit 221 starts transmitting the transmission data at the time point 84.

The delay circuit 231 waits to output the transmission data 431 until the count value 461 of the counter circuit 261 and the count value 471 of the latch circuit 271 coincide with each other. For example, when the count value 471 of the latch circuit 271 is 1, the delay circuit 231 outputs the transmission data 431 at a timing at which the count value 461 of the counter circuit 261 becomes 1. For example, the delay circuit 231 starts outputting the transmission data 431 at a time point 85.

At this time, the transmission delay time 92 is equal to one cycle of the clock signal 451.

When the count value 471 of the latch circuit 271 is 2, the transmission delay time 92 is equal to two cycles of the clock signal 451.

When the count value 471 of the latch circuit 271 is 3, the transmission delay time 92 is equal to three cycles of the clock signal 451.

When the count value 471 of the latch circuit 271 is 0, the delay circuit 231 outputs the transmission data immediately. In this case, transmission delay time 92 is 0.

Therefore, the sum of the process delay time 91 and transmission delay time 92 is equal to four cycles of the clock signal 451 and is constant regardless of the timing at which the receiving circuit 211 starts outputting the reception data.

This can reduce the jitter occurring due to the data relay.

A relay circuit (relay device 12) according to this embodiment comprises a circuit (latch circuit 271) that records the phase position of the clock at the time of reception, and a circuit (delay circuit 231) that delays transmission depending on the recorded phase.

A clock generating part (clock generating part 25) supplies clocks to a relay part (processing part 22; processing circuit 221), a receiving part (21; receiving circuit 211), and a transmitting part (24; transmitting circuit 241).

The receiving part outputs reception data synchronized with a high-speed clock, based on a regenerated clock generated from a reception signal and demodulated reception data.

The relay part generates transmission data synchronized with a low-speed clock, based on the reception data synchronized with the high-speed clock, carries out a computing process necessary for the relaying, and outputs the transmission data.

The recording part (latch circuit 271) records information indicating the phase of the data.

The delay part carries out delaying according to the phase, based on the recorded information representing the phase.

As described above, a jitter occurring internally at the time of reception can substantially be canceled by adjusting it at the time of transmission.

Embodiment 3

Embodiment 3 will be described with reference to FIG. 6 to FIG. 7.

Portions that are common with Embodiment 1 or Embodiment 2 will be denoted by the same reference numerals as in Embodiment 1 or Embodiment 2, and their explanation will be omitted.

This embodiment will describe another specific example of the relay device 12 described in Embodiment 1.

Figure 6:
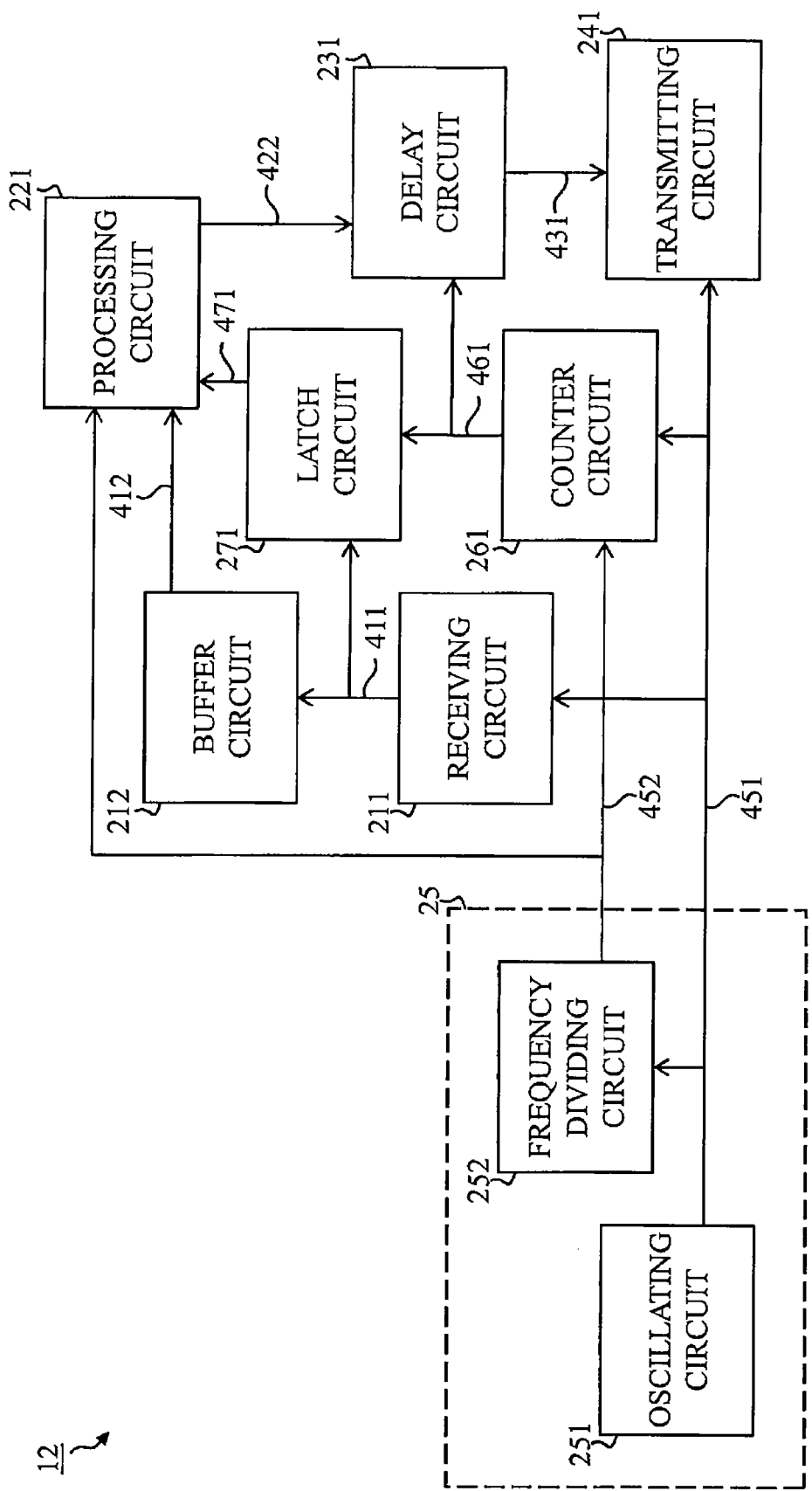
FIG. 6 illustrates an example of the circuit configuration of a relay device 12 according to Embodiment 3.

FIG. 6 illustrates an example of the circuit configuration of a relay device 12 according to this embodiment.

The relay device 12 has a receiving circuit 211, a buffer circuit 212, a processing circuit 221, a delay circuit 231, a transmitting circuit 241, a clock generating part 25, a counter circuit 261, and a latch circuit 271.

Of these components, the receiving circuit 211, the buffer circuit 212, the transmitting circuit 241, the clock generating part 25, the counter circuit 261, and the latch circuit 271 are the same as their counterparts in Embodiment 2.

When the receiving circuit 211 outputs reception data 411, first, the processing circuit 221 reads a count value 471 stored by the latch circuit 271. After that, the processing circuit 221 reads reception data 412 stored by the buffer circuit 212. The processing circuit 221 generates data in which the count value 471 is attached to the head of the reception data 412. The data generated by the processing circuit 221 will be referred to as "count-value-attached reception data". The processing circuit 221 is an example of an attaching part. The processing circuit 221 processes the count-value-attached reception data to generate count-value-attached transmission data 422, and outputs the generated count-value-attached transmission data 422. The processing circuit 221 is an example of a processing part 22. The count-value-attached transmission data 422 is data in which the count value 471 is attached to the head of transmission data 421 being a result of processing the reception data 412. The processing circuit 221 operates at a timing synchronized with a clock signal 452.

The delay circuit 231 takes the count-value-attached transmission data 422 outputted by the processing circuit 221, and separates it into the count value 471 and the transmission data 421. The delay circuit 231 outputs the separated transmission data 421 with a delay. The delay circuit 231 is an example of a delay part 23. The delay circuit 231 outputs transmission data 431 at a timing at which a count value 461 of the counter circuit 261 and the separated count value 471 coincide with each other.

Figure 7:
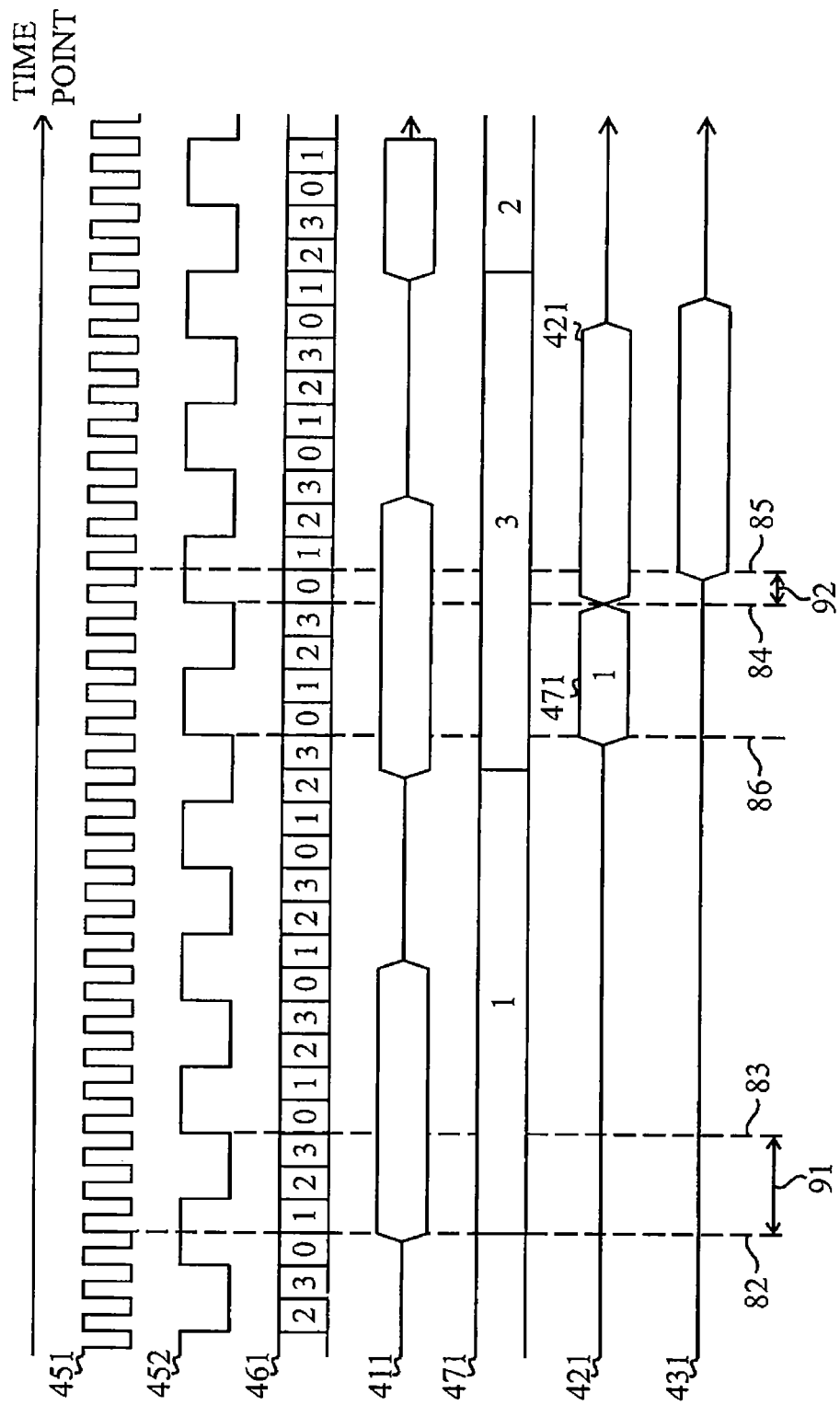
FIG. 7 illustrates an example of the operation timings of the relay device 12 according to Embodiment 3.

FIG. 7 illustrates an example of the operation timings of the relay device 12 according to this embodiment.

The axis of abscissa represents the time point.

The receiving circuit 211 outputs the reception data 411 in synchronism with the rising edge of a clock signal 451. For example, the receiving circuit 211 starts outputting the reception data 411 at a time point 82. At this time, since the count value 461 of the counter circuit 261 is 1, the latch circuit 271 stores 1 as the count value 471.

The processing circuit 221 takes the count value 471 of the latch circuit 271 in synchronism with the rising edge of the clock signal 452, and successively takes the reception data 412. For example, the processing circuit 221 starts taking the count value 471 and the reception data 412 at a time point 83.

The processing circuit 221 outputs the generated count-value-attached transmission data in synchronism with the rising edge of the clock signal 452. For example, the processing circuit 221 starts outputting the count value 471 at a time point 86, and successively starts outputting the transmission data 421 at a time point 84.

The delay circuit 231 takes the count value 471 outputted by the processing circuit 221, and stores the count value 471. The delay circuit 231 waits until the count value 461 of the counter circuit 261 and the stored count value 471 coincide with each other, and outputs the transmission data 431. For example, the delay circuit 231 starts outputting the transmission data 431 at a time point 85.

Sometimes the receiving circuit 211 starts outputting the next reception data 411 before the processing circuit 221 starts outputting the transmission data 421, as in a case where the process in the processing circuit 221 takes a long time or the reception data received by the receiving circuit 211 is short.

In that case, at the time point 84, the count value 471 stored by the latch circuit 271 has been updated to a value related to the next reception data 411.

Therefore, if output of the transmission data 431 is started at a timing at which the count value 461 of the counter circuit 261 and the count value 471 of the latch circuit 271 coincide with each other, the sum of the process delay time 91 and the transmission delay time 92 does not become constant.

In view of this, instead of having the count value 471 to be held by the latch circuit 271, the count value 471 is attached to the reception data 412, thereby generating the count-value-attached transmission data 422 attached with the count value 471. The delay circuit 231 acquires the count value 471 from the count-value-attached transmission data 422. Thus, even if the count value 471 held by the latch circuit 271 is updated, a delay based on the count value 471 corresponding to the transmission data 421 can be caused, so that the sum of the process delay time 91 and the transmission delay time 92 can be made constant.

This can reduce the jitter occurring due to the data relay.

A relay circuit (relay device 12) according to this embodiment comprises a circuit (processing circuit 221) that attaches the phase position of the clock at the time of reception to the head of the data, and a circuit (delay circuit 231) that delays transmission based on the phase position of the head of the transmission data.

A clock generating part (clock generating part 25) supplies clocks to a relay part (processing part 22; processing circuit 221), a receiving part (21; receiving circuit 211), and a transmitting part (24; transmitting circuit 241).

The receiving part outputs reception data synchronized with a high-speed clock, based on a regenerated clock generated from a reception signal and demodulated reception data.

The attaching part (processing circuit 221) attaches information indicating the phase, to the head of the data.

The relay part generates transmission data synchronized with a low-speed clock, based on the reception data synchronized with a high-speed clock, carries out a computing process necessary for the relaying, and outputs the transmission data.

The recording part (latch circuit 271) records information indicating the phase of the data.

The delay part carries out delaying based on the information representing the phase of the head of the data.

As described above, a jitter occurring internally at the time of reception can substantially be canceled by adjusting it at the time of transmission. Furthermore, different delays can be specified for the respective frames by attaching phase information to the head of the data. As a result, even when, for example, the processing order of the frames is changed, a correct delay can be applied.

Embodiment 4

Embodiment 4 will be described.

Portions that are common with Embodiment 1 to Embodiment 3 will be denoted by the same reference numerals as in Embodiment 1 to Embodiment 3, and their explanation will be omitted.

This embodiment will describe still another specific example of the relay device 12 described in Embodiment 1.

A circuit configuration of the relay device 12 according to this embodiment is the same as that of Embodiment 3, and will accordingly be described with reference to FIG. 6.

Reception data 411 to be received by a receiving circuit 211 includes information representing the type of data.

Data that a transmitting device 11 transmits to a receiving device 13 via the relay device 12 includes data that needs jitter suppression and data that does not need jitter suppression.

A processing circuit 221 checks whether or not the data needs jitter suppression or does not need jitter suppression, based on the type represented by the information included in reception data 412.

If it is determined that the data needs jitter suppression, the processing circuit 221 generates and outputs count-value-attached transmission data 422, in the same manner as in Embodiment 3.

If it is determined that the data does not need jitter suppression, the processing circuit 221 generates and outputs a count-value-attached transmission data 422 in which 0 is attached in place of a count value 471.

A delay circuit 231 takes the count-value-attached transmission data 422 outputted by the processing circuit 221, and separates it into a count value 471 and transmission data 421. The delay circuit 231 outputs the separated transmission data 421 with a delay. The delay circuit 231 is an example of a delay part 23. The delay circuit 231 outputs transmission data 431 at a timing at which a count value 461 of a counter circuit 261 and the separated count value 471 coincide with each other.

If the processing circuit 221 determines that the data does not need jitter suppression, the delay circuit 231 outputs the transmission data immediately, since the count value 471 is 0. As a result, a transmission delay time 92 becomes 0.

In this manner, when relaying data that does not need jitter suppression, time required for transmission and reception of the data can be shortened by eliminating the delay.

In a case where the data does not need jitter suppression, it is important to set the transmission delay time 92 to 0. The specific configuration for setting the transmission delay time 92 to 0 may be another configuration.

A relay circuit (relay device 12) according to this embodiment has a frame selecting function of delaying only a relay frame (data that needs jitter suppression).

Hence, frames other than the relay frame can be transmitted without a delay.

The configurations described above in the respective embodiments are merely examples and can be replaced by other configurations. For example, configurations described in different embodiments may be combined within a non-contradictory scope. The configuration of a non-essential portion may be replaced by another configuration.

The relay device (12) described above has a receiving part (21; receiving circuit 211), a processing part (22; processing circuit 221), and a transmitting part (24; transmitting circuit 241).

The receiving part receives reception data (411).

The processing part processes the reception data, to generate transmission data (421).

The transmitting part transmits the transmission data at a timing at which a transmission delay time (92) has passed since the timing at which the processing part generated the transmission data.

The transmission delay time is a difference obtained by subtracting a process delay time (91) from a predetermined overall delay time.

The process delay time is a time that passes since a timing at which the receiving part receives the reception data until a timing at which the processing part processes the reception data.

Thus, even when the process delay time changes, the time required for data relay can be made almost constant. This can reduce the jitter occurring due to the data relay.

The receiving part operates at a timing that is synchronized with the first clock (clock signal 451) of a communication frequency.

The processing part operates at a timing that is synchronized with the second clock (clock signal 452) of a processing frequency which is lower than the communication frequency.

The transmitting part operates at a timing that is synchronized with the third clock (clock signal 451) of the communication frequency.

The transmission delay time is equal to the cycle of the third clock of a transmission delay number (count value 471).

The transmission delay number indicates which cycle of the first clock, the timing at which the receiving part has received the reception data falls on, based on the cycle of the second clock.

This can reduce the jitter occurring due to the difference in clock among the receiving part, transmitting part, and processing part.

The relay device has a delay part (23; delay circuit 231).

The delay part takes the transmission data generated by the processing part, and outputs the transmission data after the lapse of the transmission delay time.

The transmitting part takes the transmission data outputted by the delay part, and transmits the transmission data.

This can reduce the jitter occurring due to the data relay.

The relay device has a recording part (latch circuit 271).

The recording part records delay time information (count value 471) representing the process delay time or transmission delay time.

The delay part operates based on the delay time information recorded by the recording part.

This can reduce the jitter occurring due to the data relay.

The relay device has an attaching part (processing circuit 221).

The attaching part attaches delay time information (count value 471) representing the process delay time or transmission delay time, to the reception data.

The processing part processes the reception data (count-value-attached reception data) attached with the delay time information, to generate transmission data (count-value-attached transmission data 422) attached with the delay time information.

The delay part operates based on the delay time information attached to the transmission data, and outputs transmission data from which the delay time information has been removed.

This can reduce the jitter occurring due to the data relay.

If the reception data is not of a predetermined type (data that needs jitter suppression), the transmitting part transmits the transmission data without waiting for the transmission delay time to pass.

This can shorten the time it takes for the data relay.

REFERENCE SIGNS LIST

10: communication system; 11: transmitting device; 12: relay device; 13: receiving device; 21: receiving part; 211: receiving circuit; 212: buffer circuit; 22: processing part; 221: processing circuit; 23: delay part; 231: delay circuit; 24: transmitting part; 241: transmitting circuit; 25: clock generating part; 251: oscillating circuit; 252: frequency dividing circuit; 261: counter circuit; 271: latch circuit; 411, 412: reception data; 421, 422, 431: transmission data; 461, 471: count value; 451, 452: clock signal; 81 to 86: time point; 90 to 92: delay time

The invention claimed is:

1. A relay device comprising:
a receiving part that receives reception data;
a processing part that processes the reception data and generates transmission data; and
a transmitting part that transmits the transmission data at a timing at which a transmission delay time has passed since a timing at which the processing part generates the transmission data,
the transmission delay time being a time obtained by subtracting a process delay time from an overall delay time,
the process delay time being a time that passes since a timing at which the receiving part receives the reception data until a timing at which the processing part processes the reception data,
the receiving part operating at a timing that is synchronized with a first clock of a communication frequency,
the processing part operating at a timing that is synchronized with a second clock of a processing frequency which is lower than the communication frequency,
the transmitting part operating at a timing that is synchronized with a third clock of the communication frequency, and
the transmission delay time being equal to a cycle of the third clock of a transmission delay number,
the transmission delay number indicating which cycle of the first clock, the timing at which the receiving part has received the reception data falls on, based on a cycle of the second clock.

2. The relay device according to claim 1, having a delay part that takes the transmission data generated by the processing part, and outputs the transmission data when the transmission delay time passes,
wherein the transmitting part takes the transmission data outputted by the delay part, and transmits the transmission data.

3. The relay device according to claim 2, having a recording part that records delay time information representing the process delay time or the transmission delay time,
wherein the delay part operates based on the delay time information recorded by the recording part.

4. The relay device according to claim 2, having an attaching part that attaches delay time information representing the process delay time or the transmission delay time, to the reception data,
wherein the processing part processes the reception data attached with the delay time information, to generate transmission data attached with the delay time information, and
wherein the delay part operates based on the delay time information attached to the transmission data, and outputs transmission data from which the delay time information has been removed.

5. The relay device according to claim 1,
wherein if the reception data is not data that needs to wait for a lapse of the transmission delay time, the transmitting part transmits the transmission data without waiting for the transmission delay time to pass.

6. A communication system having:
the relay device according to claim 1;
a transmission device that transmits the reception data to the relay device; and
a reception device that receives the transmission data transmitted by the relay device.

7. A relay method comprising:
operating at a timing that is synchronized with a first clock of a communication frequency, and receiving reception data;
operating at a timing that is synchronized with a second clock of a processing frequency which is lower than the communication frequency, processing the reception data and generating transmission data; and
operating at a timing that is synchronized with a third clock of the communication frequency, and transmitting the transmission data at a timing at which a transmission delay time has passed since a timing at which the transmission data is generated, the transmission delay time being a difference obtained by subtracting a process delay time from an overall delay time,
the process delay time being a time that passes since a timing at which the reception data is received until a timing at which the reception data is processed,
the transmission delay time being equal to a cycle of the third clock of a transmission delay number,
the transmission delay number indicating which cycle of the first clock, the timing at which the receiving part has received the reception data falls on, based on a cycle of the second clock.

* * * * *